United States Patent
Campa Monroy

(10) Patent No.: US 12,172,304 B2
(45) Date of Patent: Dec. 24, 2024

(54) AUTOMATED SYSTEM FOR HANDLING CONTAINERS WITH PRODUCT LOADING

(71) Applicant: Grupo Bimbo, S.A.B. de C.V., Mexico City (MX)

(72) Inventor: Genaro Campa Monroy, Estada de Mexico (MX)

(73) Assignee: GRUPO BIMBO, S.A.B. DE C.V., Mexico City (MX)

( * ) Notice: Subject to any disclaimer, the term of this patent is extended or adjusted under 35 U.S.C. 154(b) by 674 days.

(21) Appl. No.: 17/435,625

(22) PCT Filed: Apr. 6, 2019

(86) PCT No.: PCT/IB2019/052845
§ 371 (c)(1),
(2) Date: Sep. 1, 2021

(87) PCT Pub. No.: WO2020/178625
PCT Pub. Date: Sep. 10, 2020

(65) Prior Publication Data
US 2022/0143810 A1 May 12, 2022

(30) Foreign Application Priority Data
Mar. 5, 2019 (MX) .................. Mx/a/2019/002582

(51) Int. Cl.
*B25J 15/00* (2006.01)
*B25J 9/00* (2006.01)
(Continued)

(52) U.S. Cl.
CPC ............ *B25J 9/0093* (2013.01); *B25J 15/00* (2013.01); *B25J 18/00* (2013.01); *B65B 5/10* (2013.01)

(58) Field of Classification Search
CPC ........ B65G 57/24; B65G 60/00; B25J 9/0093; B25J 15/00; B25J 18/00; B25J 15/0616; B65B 5/10
See application file for complete search history.

(56) References Cited

U.S. PATENT DOCUMENTS 3,517,831 A * 6/1970 Hahn ..................... B65G 60/00
414/789.6
4,159,058 A * 6/1979 Zimmerman .......... B65G 57/18
414/789.2
(Continued)

FOREIGN PATENT DOCUMENTS

CN 102923489 A 2/2013
CN 105800323 A 7/2016
(Continued)

OTHER PUBLICATIONS

International Search Report of PCT/IB2019/052845 dated Nov. 25, 2019, 4 pages.

*Primary Examiner* — Patrick H Mackey
(74) *Attorney, Agent, or Firm* — Crowell & Moring LLP; John C. Freeman

(57) ABSTRACT

The present invention relates to a method and a system that has the advantage of being able to carry out different tasks of a conventional production line in a small space and with simple, low-cost elements, since product packages received by means of two packing lines are grouped and deposited so as to form various arrangements, depending on the container being handled at each particular moment. At the same time, the system is capable of receiving platforms or dollies loaded with empty containers that are to be stacked on another platform or dolly while being simultaneously and continuously filled. In addition, the system has the versatility of being able to handle platforms and dollies for mainly two different types of container, which can be accommodated in (Continued)

different configurations, using the same device without modification.

24 Claims, 11 Drawing Sheets

(51) Int. Cl.
 *B25J 18/00* (2006.01)
 *B65B 5/10* (2006.01)

(56) References Cited

U.S. PATENT DOCUMENTS

| | | | | |
|---|---|---|---|---|
| 4,588,341 A | * | 5/1986 | Motoda | B65G 65/00 414/331.14 |
| 4,687,403 A | * | 8/1987 | Motoda | B65G 60/00 414/795.8 |
| 4,765,487 A | * | 8/1988 | Bliss | B65G 57/24 209/552 |
| 4,850,752 A | | 7/1989 | Focke | |
| 5,807,065 A | | 9/1998 | Kuhl | |
| 7,643,901 B2 | * | 1/2010 | Ponti | B65G 57/24 700/217 |
| 11,919,727 B2 | * | 3/2024 | Huber | B65G 60/00 |
| 2004/0000121 A1 | | 1/2004 | Ichikawa et al. | |
| 2011/0276174 A1 | * | 11/2011 | Bolzani | B65G 47/086 901/31 |
| 2014/0369800 A1 | * | 12/2014 | Marks | B25J 9/0093 414/792.8 |

FOREIGN PATENT DOCUMENTS

| | | |
|---|---|---|
| EP | 0146643 A1 | 7/1985 |
| EP | 3227189 A1 | 11/2017 |
| GB | 2148260 A | 5/1985 |
| WO | WO 2007/002615 A2 | 1/2007 |

\* cited by examiner

AUTOMATED SYSTEM FOR HANDLING CONTAINERS WITH PRODUCT LOADING

CROSS-REFERENCE TO RELATED APPLICATIONS

This application is a filing under 35 U.S.C. § 371 of International Patent Application PCT/IB2019/052845, filed Apr. 6, 2019, and claims the priority of Mexican Patent Application MX/a/2019/002582, filed Mar. 5, 2019, both of which are incorporated by reference herein in their entirety.

FIELD OF THE INVENTION

The present invention belongs to the field of product distribution in which various equipment such as conveyors and electromechanical and servo positioning mechanisms are implemented, which generally take up a lot of space within a given production area. In particular, the present invention relates to a system and method configured to carry out, within the same piece of equipment, the process of unstacking, nesting and stacking of containers in a small work area.

BACKGROUND OF THE INVENTION

Currently, systems for handling packaged goods comprise mechanical and robotic devices that perform various functions, but such systems only perform specific functions, so they require additional systems to complete their operation. Therefore, for this type of system, large industrial buildings are used in order to house the different work stations required. This oversizing results in a higher initial investment, as well as an increase in operating costs.

In the field of handling packaged products such as bakery and pastry goods, such systems are commonly used since they are required to perform the functions of filling containers with product packages for subsequent transport and distribution. The containers that are commonly used for this type of product are stacked on pallets and must be removed (unstacked) for filling, and once the containers are filled with a given product, they must be stacked again on pallets for distribution and sale.

As mentioned above, this type of system is commonly used since all such systems use containers, pallets, conveyor belts, suction devices and robotic arms; however, in no current system is this process carried out simultaneously within the same station in a small work area, as proposed in the present invention.

Conventional systems take up a lot of space and their operation is complex since they manage the process in parts using mechanisms such as servos, which when they become desynchronized are difficult to readjust and they do not handle all the necessary arrangements for different products. Thus, in a conventional system it is difficult to implement any arrangement of products other than a pre-established arrangement, since the original design does not allow this unless it is modified for each configuration. In other words, if the equipment was manufactured to handle pallets, it can only handle pallets and not dollies as proposed in the present invention.

Thus, the present invention uses a single system made up of two forklifts, one for ascent and the other for descent, for bringing the pallets and/or dollies loaded with containers (stacked on the ascent forklift) up to the work platform of the equipment, where an articulated robotic arm can take at least one layer of containers (more than one container), by means of a gripper device, the containers then being stacked on another empty pallet or dolly (on the descent forklift), in order for them to be filled with packages, using at least one automatic articulated arm that lifts the packages via a suction device, the packages being, in the preferred embodiment of the present invention, bakery and pastry goods. Therefore, thanks to the configuration of the equipment, the system of the present invention uses a minimum of work space avoiding downtime by having the ability to perform all operations simultaneously in a single station.

Currently there are several proposals related to systems for handling containers to be filled with products. For example, U.S. Pat. No. 4,850,782 describes a conveying apparatus, specifically unstacking equipment, with a conveyor for packages of foodstuffs of different sizes and weights, and another device such as a stacker assigned to a stacking point, having a rotatable arm that can be moved vertically up and down, at the free end of which there is a suction head to hold and release the packages. As can be seen, unlike the present invention, this patent is limited to directly holding or releasing the packages coming from the conveyor belts and does not have the ability to nest them inside containers for subsequent stacking. Furthermore, this US patent is not configured to handle pallets and/or dollies and is limited to using a single pre-established type of product.

Another prior art document is European patent EP3227189 which discloses a device and method for stacking packages of different sizes on a pallet. This device comprises means for feeding an empty pallet into a loading station and means for removing the pallet after loading. Unlike the present invention, European patent EP3227189 can only stack products, not nest them, and cannot perform the tasks of stacking and transferring pallets simultaneously as mentioned in the present application.

Another prior art document is Chinese patent CN105800323 which comprises a line of conveyor rollers, a line of tray recycling rollers, a conveyor robot, a distance sensing device, a multifunctional hand gripper for the robotic arm, a sorting conveyor line and a master control system. In this system, the robotic stacking process for high-speed logistics sorting, the power conveyor roller line and the tray recycling roller line are arranged in parallel and run at the same time, the conveyor roller line is used to convey goods to the front end of a carrier robot, the tray recycling roller line is used for the reuse of trays wherein high speed sorting can be achieved and the multifunctional robotic hand gripper can grip box-type products that are lifted to different heights. Unlike the present invention, the Chinese patent does not have the ability to nest products inside containers and does not allow the reuse of pallets previously used in a continuous process. Moreover, in this patent more space is required given the use of three roller lines and its system is not configured to handle different sizes of product.

Lastly, Chinese patent CN102923489 describes a compact robotic stacking system with four stations. The robotic stacking system has the innovative aspects that the stacking system comprises a product conveyor line, a pallet conveyor line, a conveyor mechanism, a stacking robot and an empty pallet supply device; the pallet conveyor line has four stations which are compactly arranged and specifically comprises a pallet supply station, a pallet waiting station, a product stacking station and a full stacking output station. Like the present invention, Chinese patent CN102923489 uses equipment adapted to be used in small spaces, but in the case of this patent, the containers are not filled with goods and the pallet is not reused in a continuous movement. It also does not allow the use of different types of containers or packages.

Therefore, none of the currently known systems describes equipment that performs all the functions, i.e. unstacking, filling, stacking of containers with goods, simultaneously within the same piece of equipment. Moreover, none of the robotic arms of the prior art is configured to use a tool capable of taking hold of a layer of containers all at once (multiple containers), while the previous layer of containers is being filled. Therefore, the present invention proposes an innovative, flexible, economical and highly efficient system for handling containers with different characteristics within the same piece of equipment, which moreover takes up a small space and is configured to simultaneously perform the tasks of handling pallets or dollies and the steps of unstacking, filling and stacking of containers in a continuous process.

AIMS

The main aim of the present invention is to provide a handling system and method with product loading that performs the functions of unstacking, filling and stacking containers in a process that is economical, continuous, flexible and highly efficient.

Another aim of the present invention is to provide a system that uses equipment that covers a small area, with the ability to handle the entry and exit of pallets loaded with full and empty containers.

Another aim of the present invention is to provide a system that uses ascent/descent forklifts to manage the unstacking, filling and stacking of empty containers in a small space.

Another aim of the present invention is to use articulated arms for lifting the product packages so as to place them inside empty containers with various configurations.

Another aim of the present invention is to provide a robotic arm equipped with a special gripper device for taking hold of and depositing a layer of empty containers on a pallet supported on the descent forklift.

Another aim of the present invention is to use bucket trains, made up of conveyor belts, which can convey the product packages up to the height of the product standby zone to facilitate the operation of the articulated arms.

Another aim of the present invention is to reuse, in a continuous movement of the system, the inlet pallet as outlet pallet.

Another aim of the present invention is to use connecting conveyor belts.

BRIEF DESCRIPTION OF THE DRAWINGS OR FIGURES

The foregoing aspects and many of the concomitant advantages of this invention will become clearer from the following detailed description, considered in conjunction with the accompanying drawings, in which.

DETAILED DESCRIPTION OF THE INVENTION

As will be described below, the proposed invention relates to a system and method for handling containers to be filled with product packages, mainly products relating to bakery and pastry goods. The main quality of the system of the present invention is that it is capable of performing all the functions of a conventional container filling and handling line, which is used for this type of product, in a single piece of equipment that requires a single work station thanks to the simultaneous operation of its components.

The present system has the advantage of being able to carry out various functions of a conventional production line in a confined space with simple, low-cost elements, since the product packages that are received via two bagging trains are grouped together and deposited to form different arrangements depending on the container that is being handled at any given time; and at the same time, the system has the capacity to receive pallets or dollies loaded with empty containers, to be stacked on another pallet or dolly while being filled simultaneously and continuously. The system also has the versatility to handle pallets and dollies for mainly two different types of container, which can be accommodated in different configurations using the same equipment without making any modifications.

Additionally, the system of the present invention uses articulated arms that are designed to work in confined spaces and that can handle the length of each layer of containers on the pallet. Furthermore, the design of the gripper device coupled with the main robotic arm complies with the weight and handling of the different product arrangements.

In summary, the system of the present invention takes up 70% less space than commercial systems since its versatility is very high for handling different containers, arrangements, etc., it has the flexibility to create various existing arrangements of products, and it can accept new arrangements without significant changes, and the components of the equipment are commercial and it is not difficult to obtain spare parts. Likewise, the system is developed with local protocols, allowing easy understanding of the system and therefore maintenance of this system is less complicated than in other equipment.

Figure 1A:
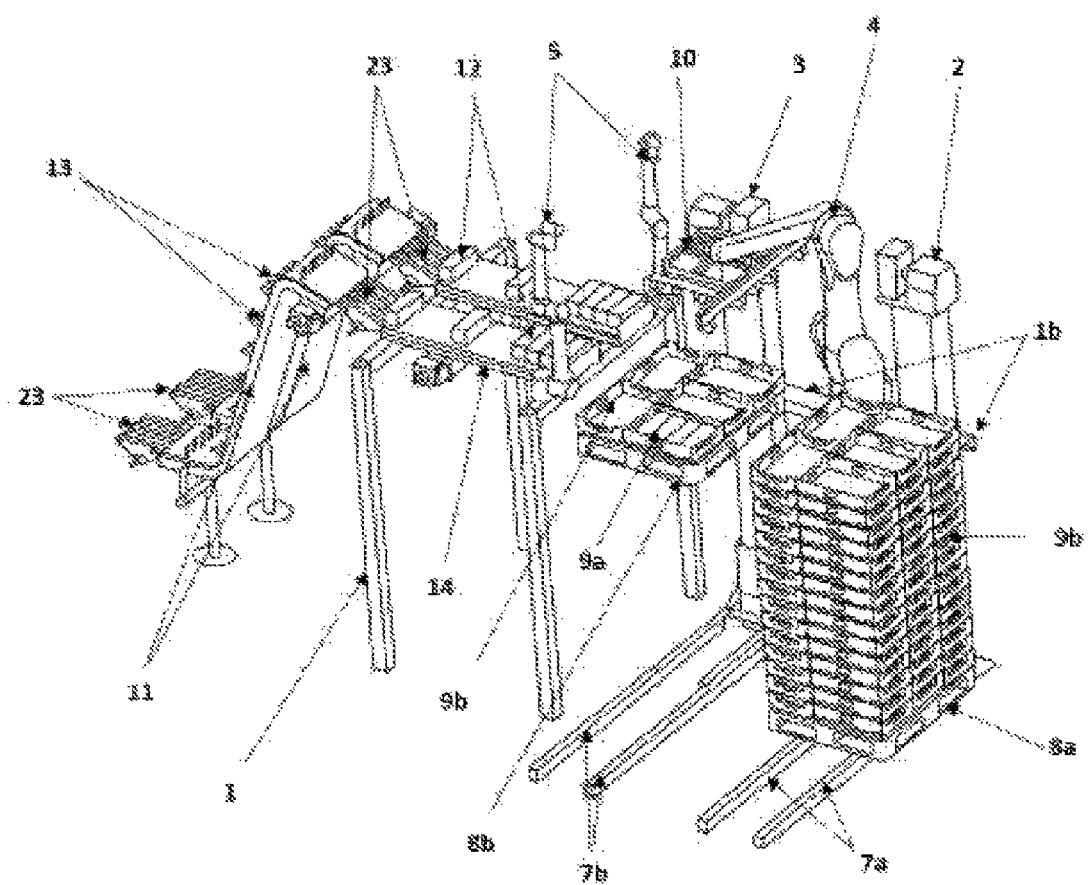
FIG. 1a is a cross-sectional view of the equipment constituting the system for handling containers with product loading.
Figure 1B:
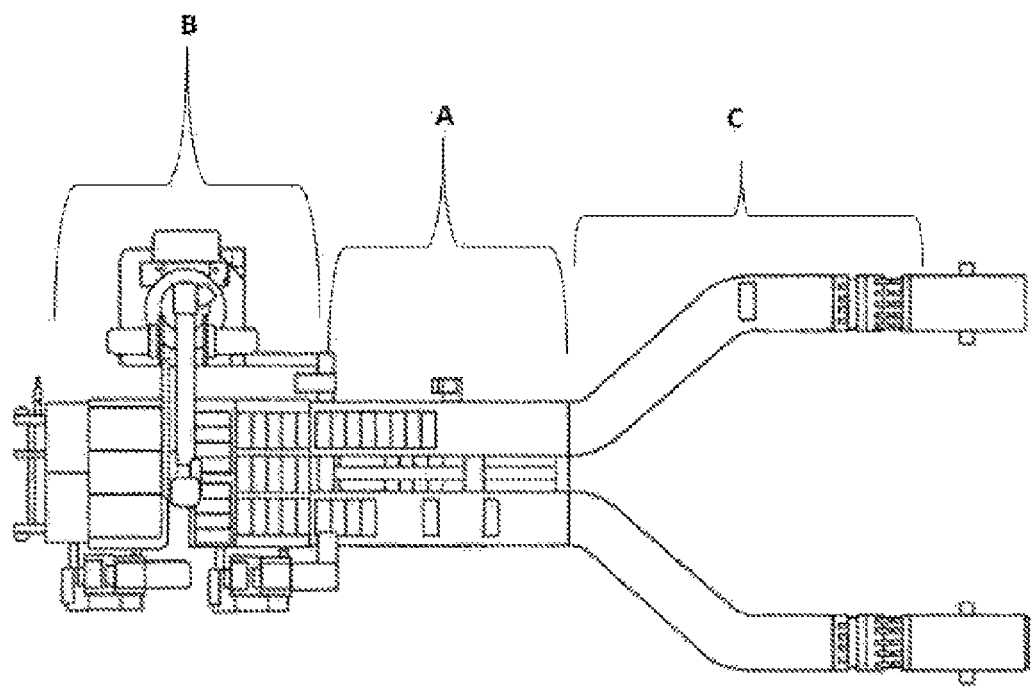
FIG. 1b is a plan view that generally shows the work zones A, B and C that make up the system according to the present invention.

The equipment constituting the system of the present invention is shown in FIG. 1a, with the frame or main support structure (1) made up of several vertical and horizontal members that define a stable, strong platform that has the function of housing and supporting the various components of the proposed system. The structure defining the support (1) is designed to connect and house all the components required to perform the function of at least three work zones (A), (B) and (C). As shown in FIG. 1b, the system comprises a work zone (A) for grouping together and accumulation of products, product packages in the preferred embodiment of the present invention, a work zone (B) for unstacking, stacking and filling of containers, and a work zone (C) for conveying product packages. In the lower part of the support (1), in the space defined by the work zone (A), are housed the electric motors (not shown) that move the conveyor belts (14) forming part of the grouping zone and the regenerative air compressors that drive the suction devices (shown subsequently), which use the articulated arms (5) to lift the product packages (12).

Additionally, two forklifts, one for ascent (2) and one for descent (3), make up the work zone (B) for unstacking, filling and stacking of containers. This zone is defined by a work platform (1b) formed by C-shaped crossbars (25a, 25b). This zone (B) operates with full containers (9a) and with empty containers (9b). Two guide rails (7a) allow access by an inlet pallet or dolly (8a) previously loaded with nested empty containers (9b), the pallet (8a) slides on the rails (7a) by means of a series of rollers of which it is composed until it is mounted on the forks (not shown) of the ascent forklift (2), so that the pallet (8a) of empty containers (9b) can be lifted to the work platform (1b) where the robotic arm (4) is supported.

At an intermediate point between the two forklifts (2, 3), on the work platform (1b) of the main support (1), the robotic arm (4) is located, this being a fully articulated tool capable of extending and rotating on its own axis about 360°. The robotic arm (4) performs the function of taking and holding the empty containers (9b) (in layers or individually), which are supported on the inlet pallet (8a) before being deposited on the outlet pallet or dolly (8b). The outlet pallet (8b) is supported by the forks (not shown) of the descent forklift (3) while the empty containers (9b) are placed thereon, so that once in place, they are filled with product packages (12) so as to form full containers (9a) filled with the product packages. The articulated arms (5) have the task of filling the empty containers (9b), one layer at a time, so that when the layer is filled with containers loaded with product packages (9a), a second layer of empty containers (9b) is stacked on the latter, repeating the cycle. This process will be repeated for each layer of empty containers (9b) that is unstacked from the inlet pallet (8a) and placed on the outlet pallet (8b) so as to be filled with packages (12), followed by subsequent stacking of full containers (9a). It should be mentioned that the robotic arm (4) also has the function of rotating the empty containers (9b), before they are filled and stacked, so that they are placed in their correct position for stacking and distribution, according to the parameters pre-set by the operator.

The robotic arm (4) is also programmed with special sensors and logic that allow it to identify if the empty containers (9b) are "nested", i.e. if they are stacked in the same direction, meaning that each container immediately on top is fully embedded within the previous container, resulting in minimal separation between the two. In this sense, when the empty containers (9b) go from the inlet pallet (8a), which is on the ascent forklift (2), to the outlet pallet (8b), which is on the descent forklift (3), the robotic arm (4) will identify the original position of each empty container (9b) and will determine if it should keep it in the same position or rotate it in the opposite direction to the position of the previous filled container (9a) that is already placed on the pallet (8b) on the descent forklift (3), allowing the full containers (9a) to be "stacked" instead of "nested", thereby creating a space between the containers (9a) which prevents the product packages (12) inside the containers from being crushed.

As mentioned at the beginning of the present description, the present system has the ability to work simultaneously, that is, as the robotic arm (4) takes a certain layer (a certain number of containers) of empty containers (9b) from the inlet pallet (8a) to place them on the outlet pallet (8b), the ascent forklift (2) will move up by a step equivalent to the layer removed from the pallet (8a) while the descent forklift (3) will move down by the same step equivalent to the last layer of full containers (9a) on the outlet pallet (8b). It is important to mention that during the time for which the robotic arm (4) keeps a certain layer of empty containers (9b) raised, the articulated arms (5) keep filling the empty containers (9b) that are already supported on the outlet pallet (8b) until that layer is completed by full containers (9a).

Figure 2A:
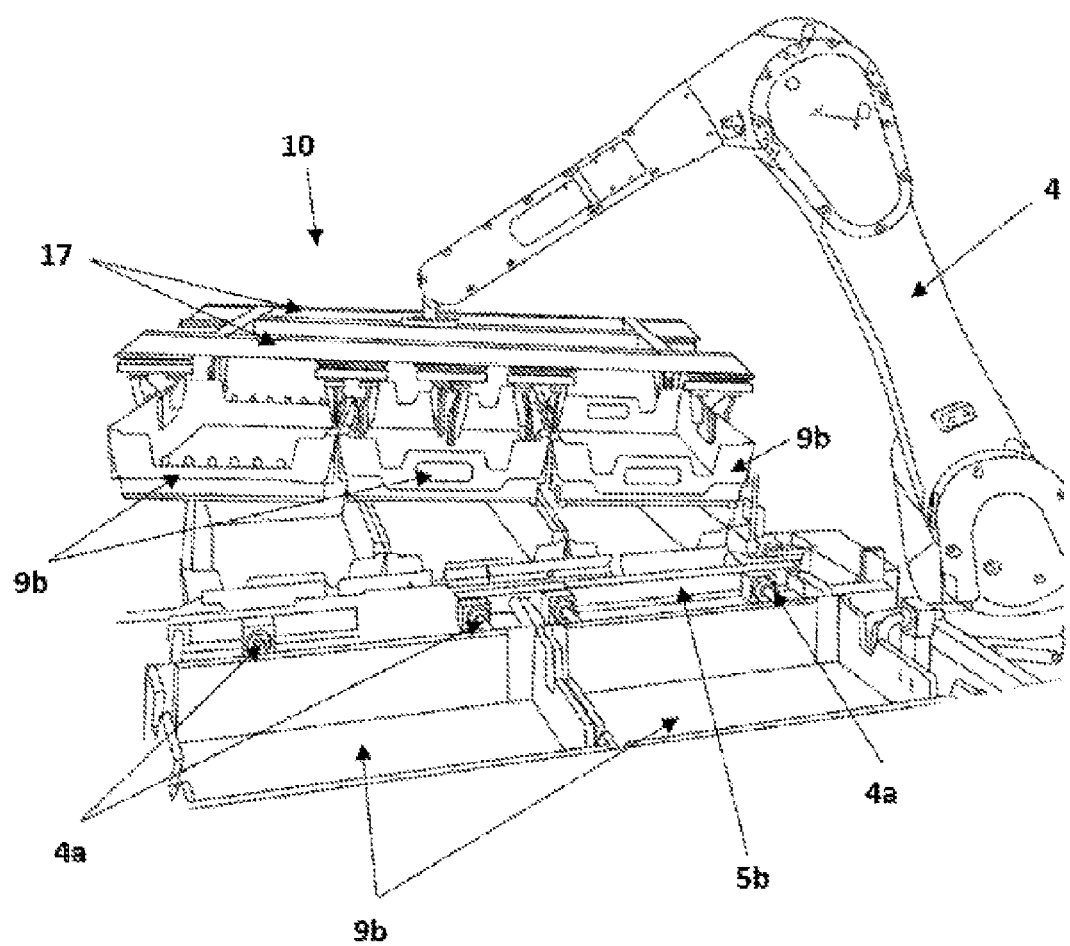
FIG. 2a is a perspective view showing the operation of the gripper device coupled with the robotic arm.

Another feature of this system is its versatility that allows it to adapt to different types of containers regardless of their variation in size and configuration. This adaptability of the system is achieved thanks to the gripper device (10), shown in FIG. 2a, and in greater detail in FIG. 2b, which is coupled to the free end of the robotic arm (4). The gripper device (10) has the ability to take at least one empty container (9b), five containers (9b) in the preferred embodiment, and hold them firmly while they are suspended during their transfer from one pallet to the other.

A series of adjustment devices (4a) are arranged in the internal part of the crossbars (25b) that form the frame (1b) that surrounds the pallets (8a, 8b), for accommodating the containers (9b) when they are already on the pallet (8b), since the adjustment devices (4a) are rods with curved ends that move horizontally to push the containers (9b) towards the center of the pallet (8b), keeping them aligned and ready for filling.

Figure 2B:
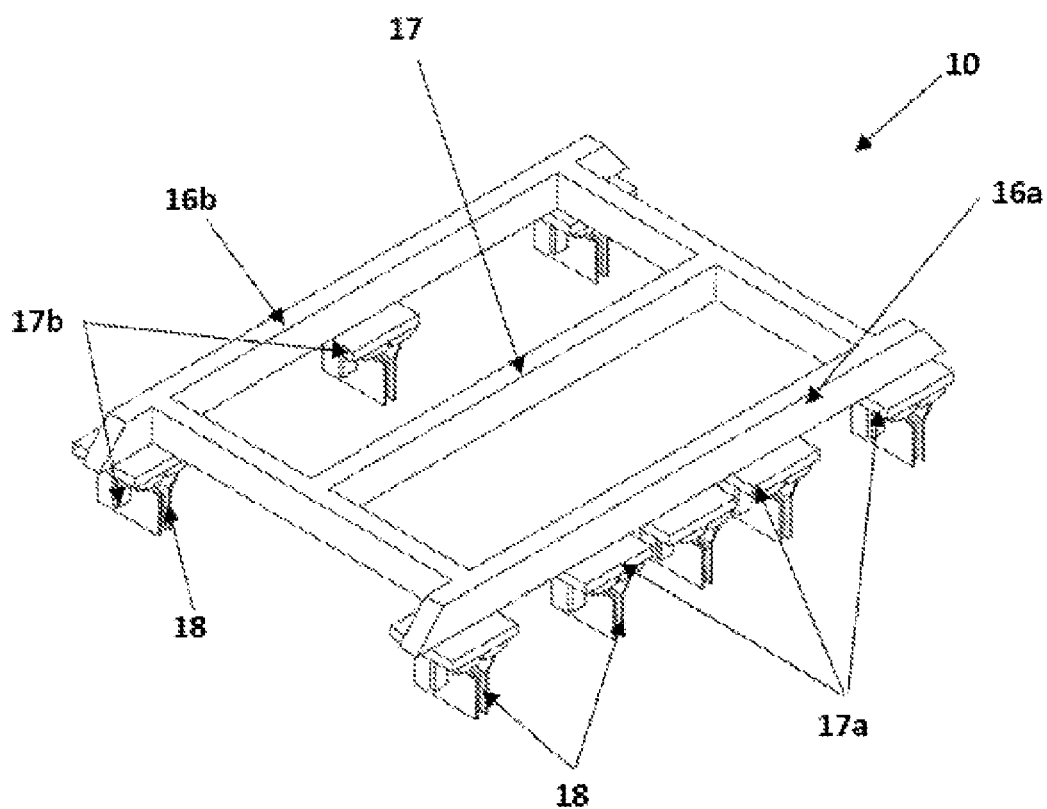
FIG. 2b is a detailed view of the gripper device.

The gripper device (10) is also made up of a rectangular shaped metal frame (17), see FIG. 2b, which has two parallel longitudinal load rails (16a, 16b) that support a variety of clamps; in the preferred embodiment there are five clamps (17a) under the first rail (16a) and three clamps (17b) under the second load rail (16b). Each clamp (17a, 17b) has inner faces with non-slip material with a serrated surface (18) that keeps the containers (9b) firmly held as they are lifted and transferred from the pallet (8a) to the pallet (8b).

The configuration of the clamps (17a, 17b) on the frame (17) also makes it possible to hold containers with two main dimensions, a large container measuring 58.8×78.8×15.5 cm and a small container measuring 39.4×58.8×13.5 cm, although they can be reconfigured to fit containers of different dimensions.

Figure 3A:
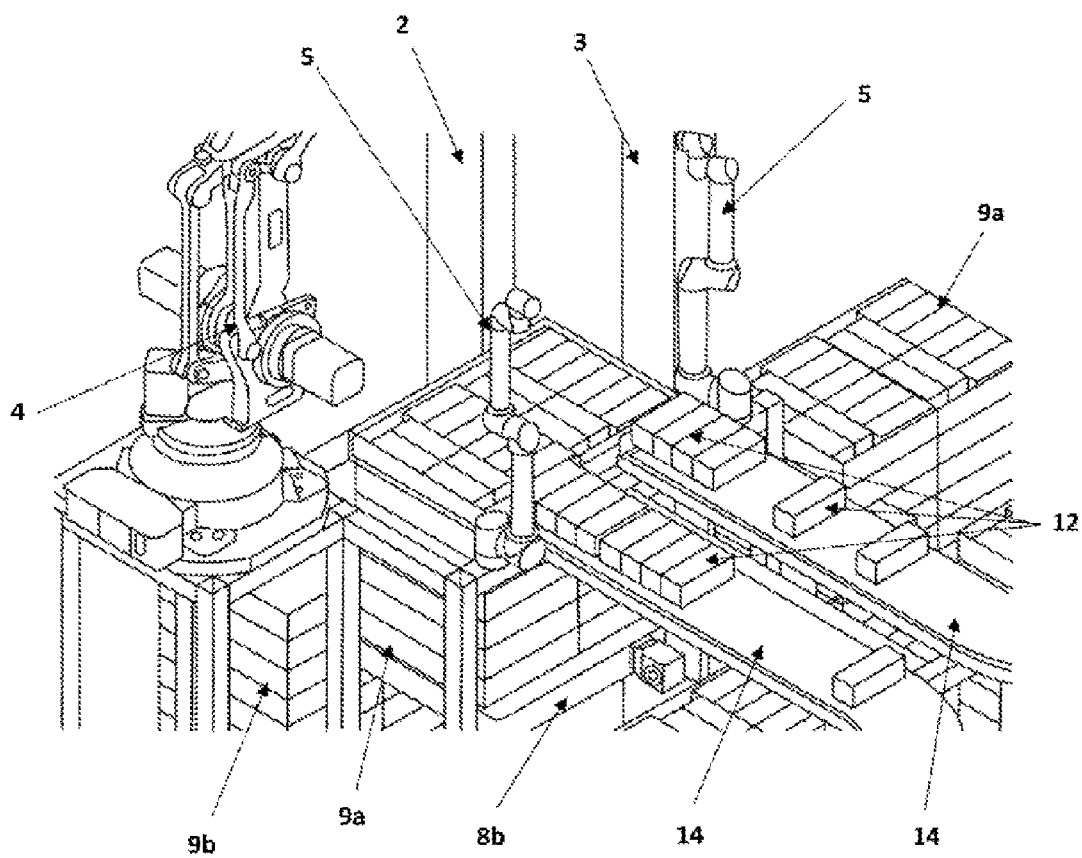
FIG. 3a is a perspective view showing the elements that make up the work zone A.
Figure 3B:
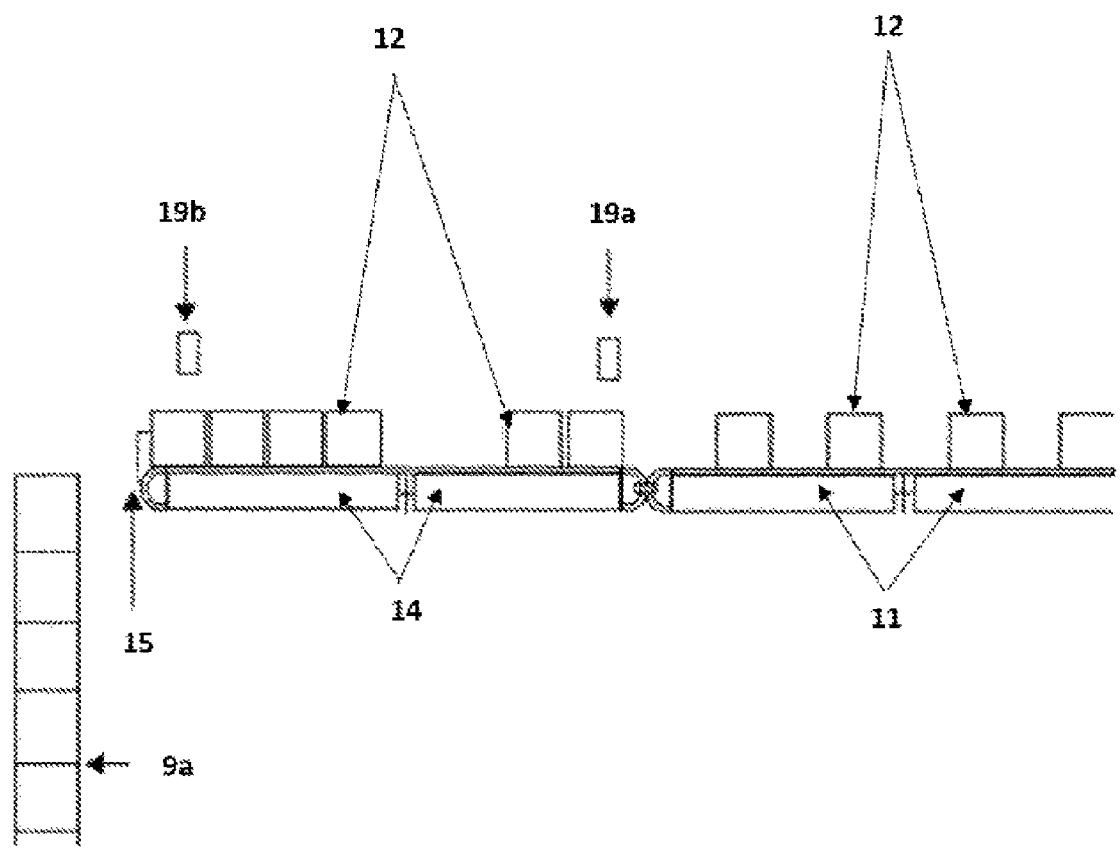
FIG. 3b is a side view showing work zones A and C.

With reference to the first work zone (A) for grouping and filling, FIG. 3a shows two parallel discontinuous conveyor belts (14), where the product packages (12) coming from the packaging zone (not shown) accumulate, the conveyor belts (14) are in continuous motion and therefore retention gates (15) are used, shown in FIG. 3b. These gates (15) are located at the edges of the conveyor belts (14) to prevent the product packages (12) from moving while the conveyor belt (14) carries on rolling.

Each of the two articulated arms (5), in the preferred embodiment of the present invention, are located on each lateral side of the conveyor belts (14) near the gates (15). The articulated arms (5) detect the presence/absence of product packages (12) arriving at the first work or grouping zone (A) by means of first and second presence sensors (19a, 19b) on the sides of the conveyor belt (14). When the sensors (19a, 19b) detect the presence of product packages (12), the articulated arms (5) are activated automatically to fill the empty containers (9b) that have already been placed on the pallet (8b) by the robotic arm (4).

Figure 3C:
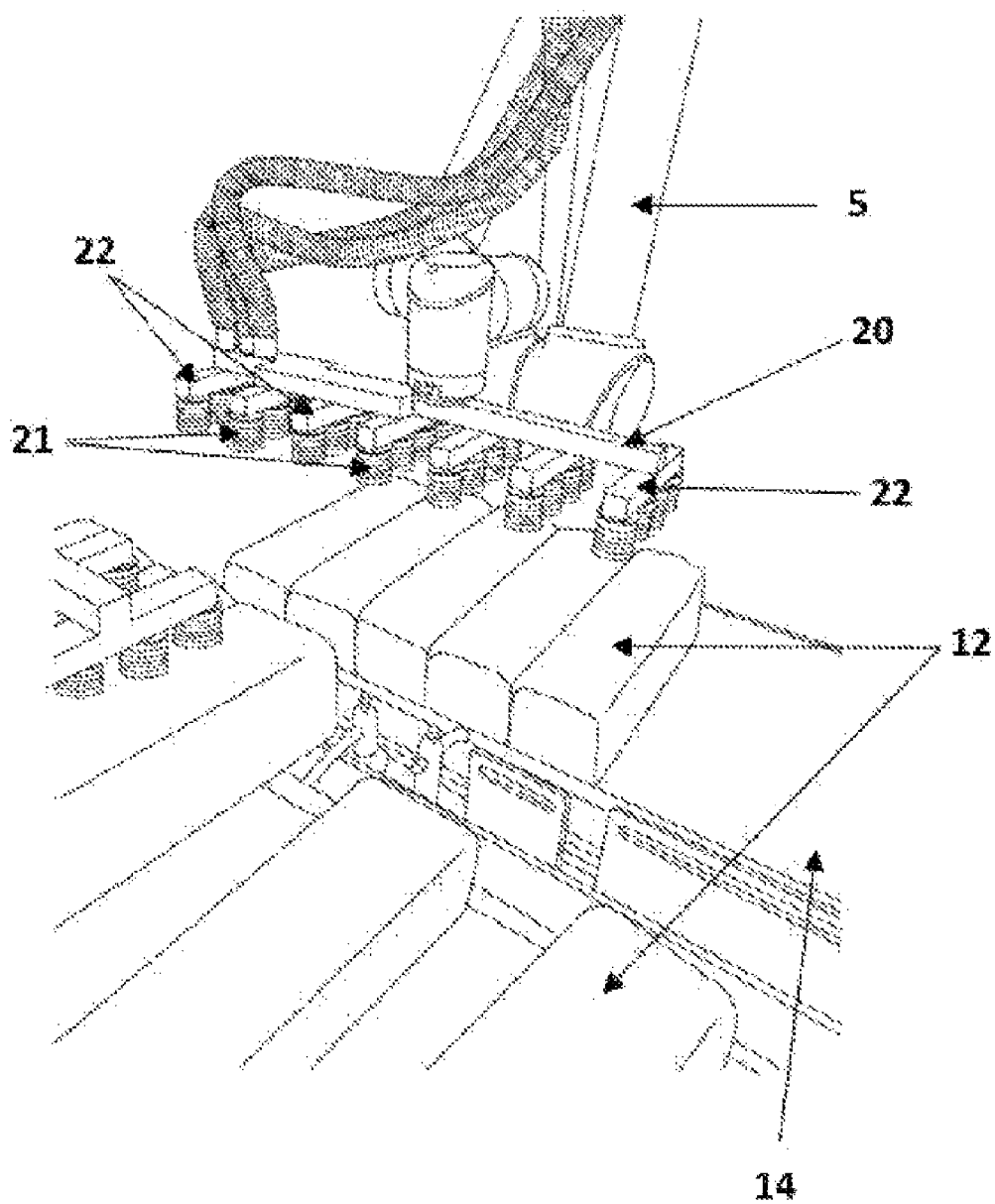
FIG. 3c is a perspective view showing the suction devices coupled to the articulated arms for filling packages into containers.

To perform its task, each articulated arm (5) has, attached to its free end, a suction device (20), which is shown in FIG. 3c, made up of a tree of suction cups (21) distributed in clusters of four on each branch (22); this distribution may vary depending on the packages. The suction cups (21) are activated by regenerative compressors to lift by suction as many product packages (12) as necessary, depending on the number of containers to be filled or the configuration and size of the latter, when they are stopped on the conveyor belts (14) by the gates (15), so as to subsequently place the product packages inside the empty containers (9b) that have already been placed on the pallet (8b).

It is important to mention that each articulated arm (5) of the system of the present invention has the capacity to fill all the containers (9b) in each given layer. However, in the preferred embodiment, two articulated arms (5) are used since, if either of them is out of service owing to breakdown or maintenance, there are no repercussions on the productivity and operation of the system.

At least two parallel filling trains make up the third work zone (C), shown in FIGS. 1a, 1b and 3b. They are made up of conveyor belts with continuously moving buckets (11) in an ascending configuration for the purpose of conveying the product packages (12) to the work platform (1b) of the robotic arm (4). The product packages (12) are conveyed from the packaging zone (not shown) to the lower end of each ascending conveyor belt (11) where the product packages (12), with the aid of a series of perpendicular fins (13), are raised to the first grouping zone (A), defined by the conveyor belts (14), corresponding to each ascending conveyor belt (11).

Figure 4A:
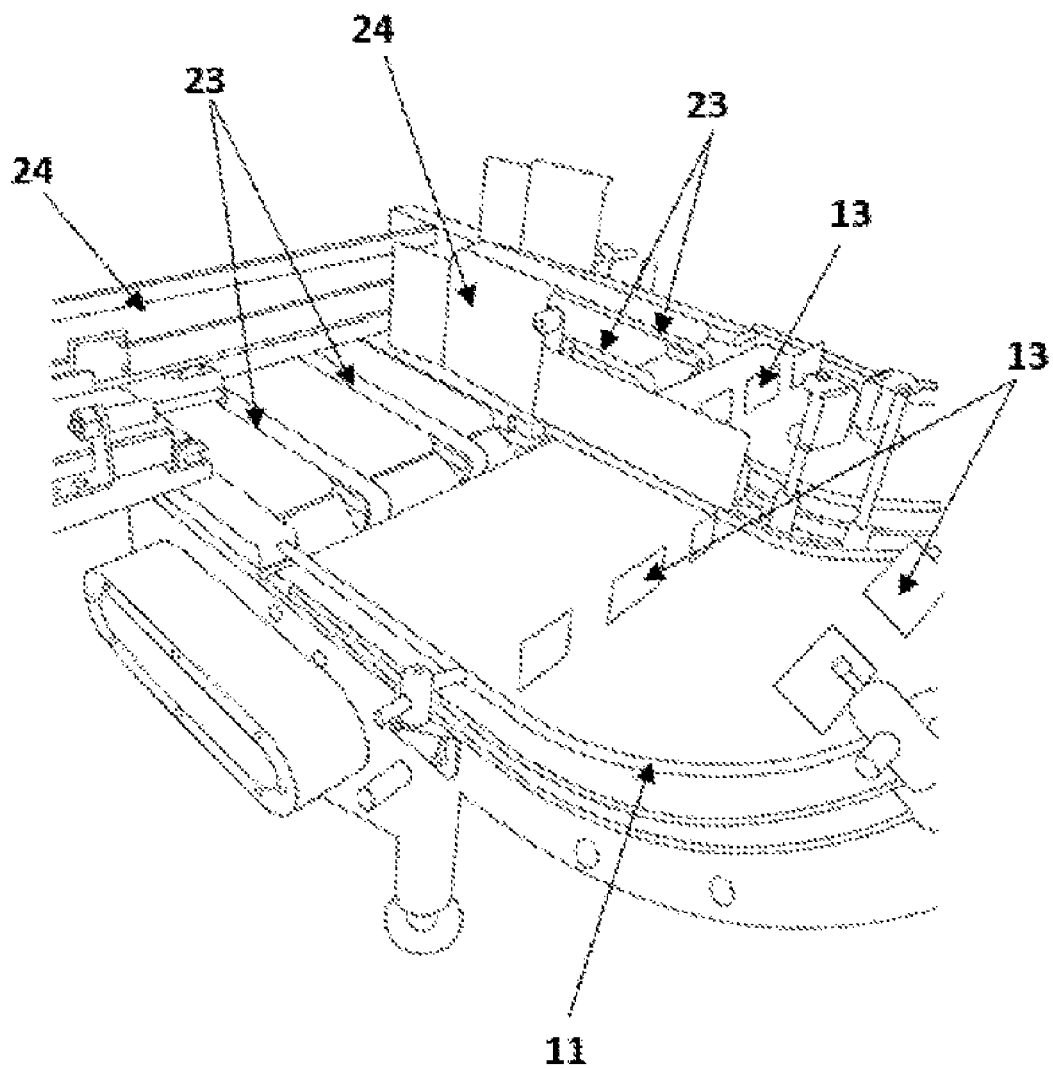
FIG. 4a is a perspective view showing the connecting belts at the bottom of the bucket conveyor belts with the conveyor belts coming from the packaging zone.
Figure 4B:
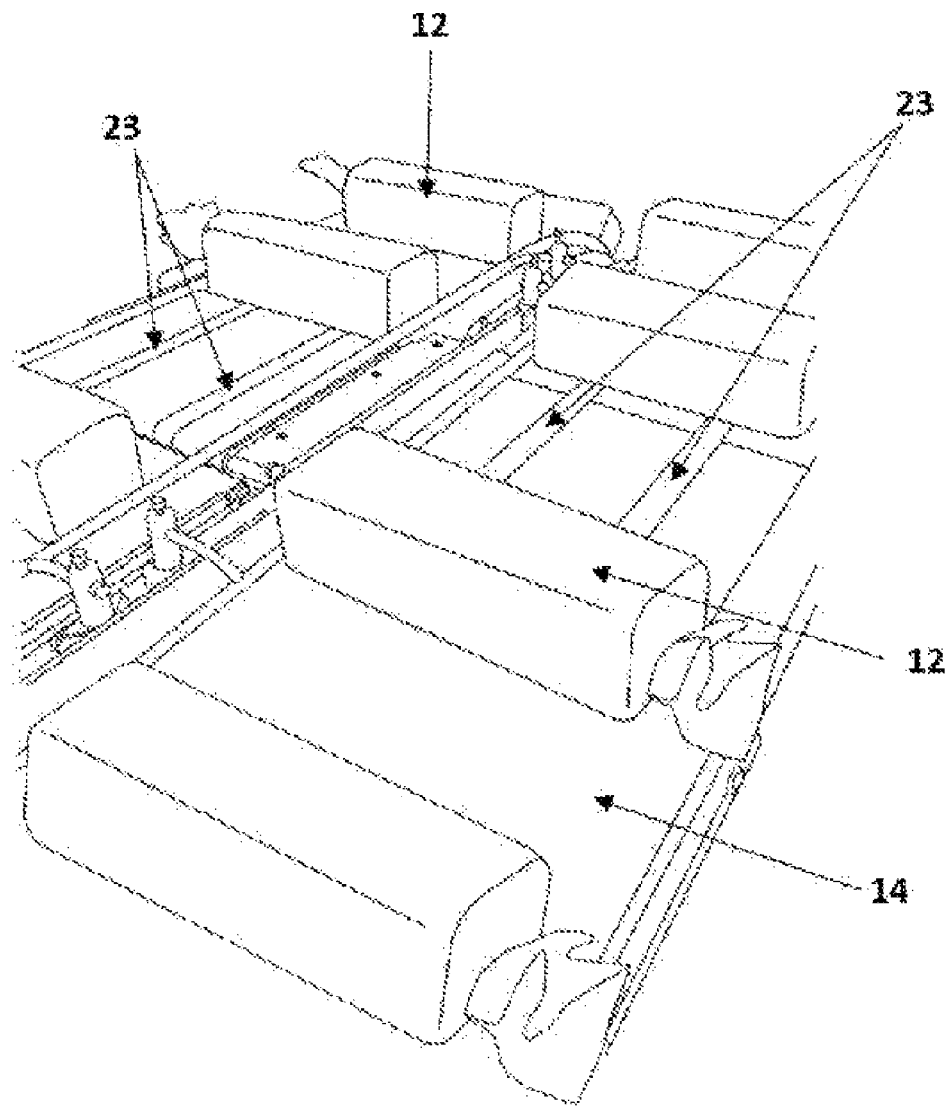
FIG. 4b is a perspective view of the connecting belts at the top of the bucket conveyor belts for conveying packages to the work zone A.

At least two connecting belts (23), shown in FIG. 1 and in detail in FIGS. 4a and 4b, are made up of individual belts with continuous movement for moving the product packages (12) horizontally, the belts (13) serving to connect the packages coming from the distribution chutes (24) of the packaging zone, with the ascending conveyor belts (11) before they are subsequently picked up by the perpendicular fins (13) of the latter.

The connecting belts (23) are also present at the upper end of the ascending conveyor belts (11), see FIG. 4b, to horizontally transfer the product packages (12) from the ascending conveyor belts (11) of the third work zone (C) to the conveyor belts (14) of the first work zone (A).

Figure 5:
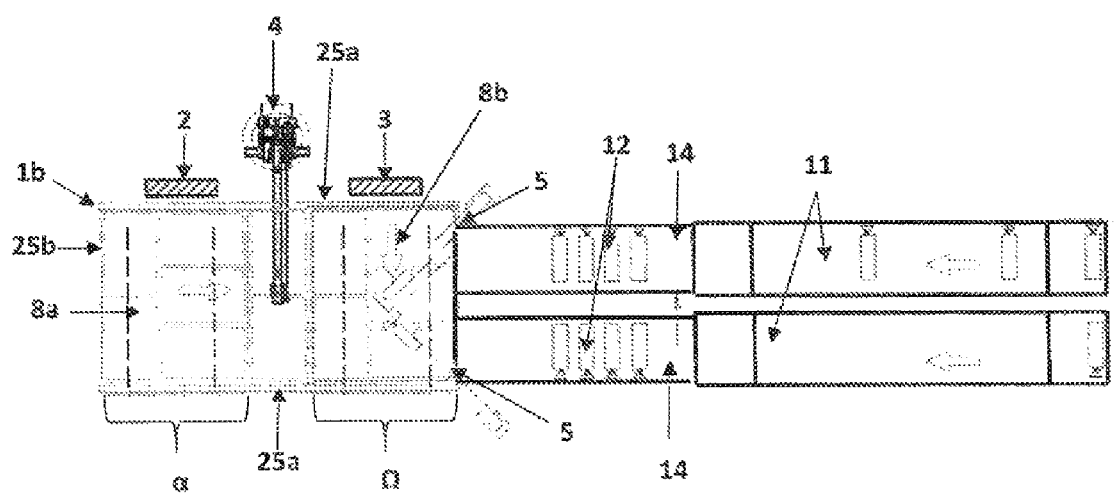
FIG. 5 shows a plan view of the work zone B where the change of pallets for reuse is exemplified.

Lastly, FIG. 5 schematically shows the pallet transfer carried out according to the present invention to reuse the inlet pallet (8a) that enters the ascent forklift (2). The structure of the work platform (1b) that defines the second work zone (B) is made up of crossbars (25a, 25b) that form the frame of the work platform (1b) around the inlet pallet (8a) and outlet pallet (8b) when they are at the operating height of the robotic arm (4). As mentioned in previous paragraphs, the pallet (8a) ascends by one step at the same time as the pallet (8b) descends by the same step as the empty containers (9b) are passed from one pallet to the other (from pallet 8a to pallet 8b), in such a way that when only one layer of empty containers (9b) is left to pass from the inlet pallet (8a) to the outlet pallet (8b), the robotic arm (4) keeps this last layer of empty containers (9b) raised, leaving the inlet pallet (8a) empty, and in turn, the empty pallet (8a) will cease to be supported by the forks of the ascent forklift (2) and will then be held by at least four pneumatic cylinders mounted on horizontally moving carriages (not shown) that run horizontally within the crossbars (25a) defining the work platform (1b). Once the pallet (8a) is firmly held in place, the moving carriages move within the crossbars (25a) in order to move the pallet (8a) from the stacking position on the forklift (2) (zone α) to the filling position on the forklift (3) (zone Ω). Thus, the pallet (8a) that was originally supported on the ascent forklift (2) now takes the place of the pallet (8b) on the descent forklift (3) and thereafter, the last layer of empty containers (9b) that is kept raised by the robotic arm (4) is then placed on the current pallet (8b, formerly 8a) and the cycle starts again. It is important to mention that once the pallet (8a) takes the place of the new pallet (8b), it ceases to be supported by the cylinders of the moving carriages but is henceforth supported by the forks of the descent forklift (3).

Figure 6:
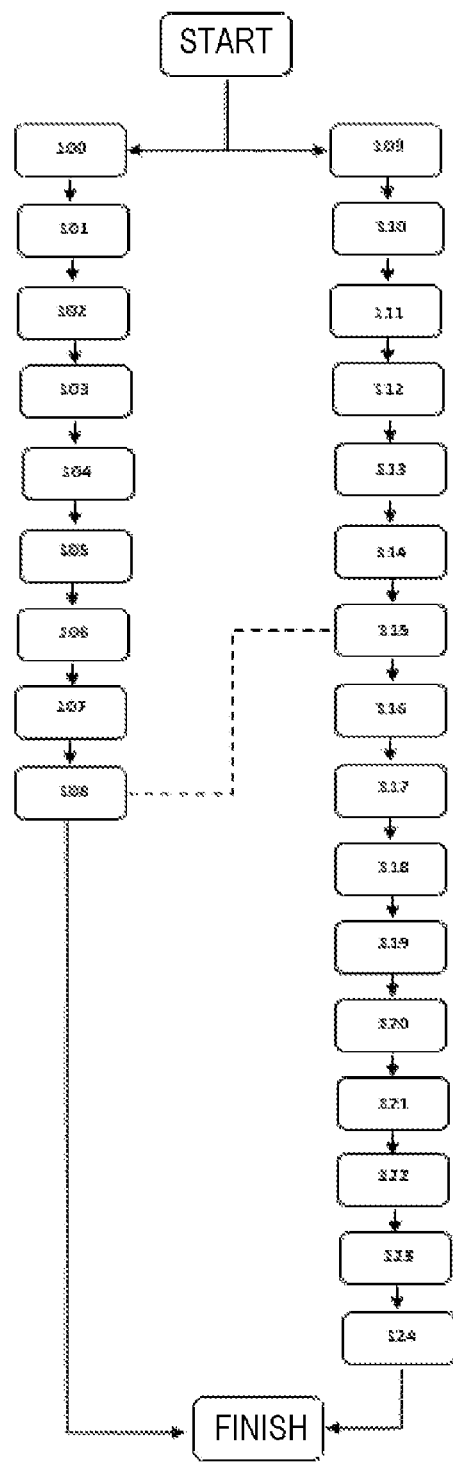
FIG. 6 shows a flow chart of the method implemented in the present invention.

FIG. 6 shows the flow diagram of the method implemented for the product container loading system, which consists of:

Product reception conveyors.
Product lifting conveyors.
Product grouping conveyors.
At least two articulated arms with a reach of 1.8 m.
Two regenerative compressors.
Ascent forklift for pallet with empty containers.
Descent forklift for pallet with full containers.
Articulated robotic arm with weight capacity of 25 kg and with a reach of 3 m.
Work platform with frame for taking layers of containers and area for depositing layers of containers, for positioning products.
Drag chains with pushers for entry and exit of pallets in the ascent and descent forklift zone.
Control panels for each articulated arm.
Main control panel.

There are four main steps in the system: entry of product packages, entry of pallet with empty containers, unstacking of containers and loading with product, exit of pallet with containers and product.

The product packages are received (100) via two bagging trains (wrapped product from the packaging zone) with the cadence of the line by means of a bucket conveyor, the product is raised (101) to the height of the package grouping zone (A) at the same height as the work platform of the robotic arm; at that height, the product is received (102) by a conveyor with sensors that counts (103) the pieces in the group and sends (104) the signal to the main processor indicating that the group is complete, so as to notify (105) the articulated arms that they should take (106) the product according to the programmed arrangement. As the product groups are formed, the articulated arms in the grouping zone (A) lift (107) the product packages using the vacuum of the regenerative compressors and move them (108) towards the empty containers following the instructions given to them by the main processor (container # and position). Coordination between the articulated arms is of vital importance to avoid any collision between product and gripper device.

In parallel (in addition), the pallets with empty containers are received (109) in the work zone (B) and they are inserted (110) semi-automatically, using either a mechanical or electric pallet truck, onto the rails with rollers that are at floor level. The pallets are left in an initial position, in which they are centered by a pneumatic system and, once this is done, the pallets are brought (111), by means of a drag chain (equipped with a pusher), to the ascent forklift zone (one pallet at a time). When the ascent forklift has a pallet present, it begins to lift (112) the empty containers to an unstacking position, which is indicated by a sensor installed on the work platform. At that moment, the articulated arm (25 kg load capacity), using a special gripper device, takes (113) the arrangement of containers on the inlet pallet (layer by layer) and passes them (114) to the outlet pallet in a second zone for them to be filled (115) with product and stacked. Every time the articulated arm leaves a layer of containers on the outlet pallet in the stacking zone, the ascent forklift moves (116) the inlet pallet upwards, leaving the next layer ready for the next intake. Meanwhile, the outlet pallet on the descent forklift waits (117) for the layer of positioned containers to be filled (118) with product (positioned by the two articulated arms described above), before descending (119) to a lower position and leaving (120) space for the next layer of empty containers to be positioned.

It is vitally important that there is precise synchronization between the articulated product filling arms, the articulated robotic arm that handles the layers of containers, and the ascent and descent forklift so that the work of unstacking, filling and stacking can take place.

Once the outlet pallet is complete, with the layers of containers full (as programmed), the descent forklift moves (121) to its final path so as to leave the outlet pallet supported on the roller guide rails in the frame of the outlet pallet main framework, and immediately afterwards, that pallet is removed (122) by means of a drag chain and a pusher to a reliable zone, where it can be picked up by a mechanical or electric pallet truck.

While the outlet pallet bearing full containers is being removed, the inlet pallet on the ascent forklift detaches from the forklift forks and is supported (123) by pneumatic cylinders forming the moving carriages that run within the crossbars of the work platform. Once the inlet pallet is supported, the moving carriages are arranged to move (124) the pallet from the unstacking position on the ascent forklift to the stacking and filling position on the descent forklift, to start the cycle again.

Although preferred embodiments have been shown and described, a person skilled in the art can make modifications thereto without departing from the scope or teachings of the present invention. The embodiments described herein are intended purely as examples and are not limiting.

Many variations and modifications to the configuration of the system and the methods for implementation thereof are possible, and all of these variations are within the scope of the invention.

Variations and modifications to the system are also possible, such as the elimination of some of the processes described or the addition of a function to the system. All of these variations are within the scope of the invention.

For example, the filling systems, the type of forklift, the size, shape and material of the containers, the material of the gripper devices and the functions, position and location of the robotic arm, as well as the number of containers that can be supported by the gripper tool, can be varied. Other accessories such as stairs and gangways can also be considered without being limited to their use. Consequently, the scope of protection is not limited to the embodiments described herein, but is only limited by the following claims, the scope of which will include all equivalents of the subject matter of the claims.

The invention claimed is:

1. A system for handling containers with product loading, comprising:
a main support defining a platform that houses and supports various components of the system, and performs unstacking, filling, and stacking of containers;
a first work zone comprising:
two parallel discontinuous conveyor belts with a gate at one end thereof for accumulation of product packages coming from a packaging zone; and
an articulated arm located on an outer lateral side of at least one of the two parallel discontinuous conveyor belts, wherein the articulated arm comprises a free end that is coupled to a suction device actuated by regenerative compressors for lifting as many of the product packages as necessary from the two parallel discontinuous conveyor belts so as to subsequently place the product packages inside empty containers;
a second work zone comprising:
a work platform serving as a frame;
a first forklift for ascent comprising:
a first guide rail comprising a first series of rollers;
a second guide rail comprising a second series of rollers; wherein the first forklift for ascent provides, via the first guide rail and the second guide rail, access by an inlet pallet loaded with nested empty containers;
a second forklift for descent that is parallel to the first forklift, wherein the second forklift comprises:
a third guide rail comprising a third series of rollers;
a fourth guide rail comprising a fourth series of rollers; wherein the second forklift for descent allows, via the third guide rail and the fourth guide rail, removal of an outlet pallet loaded with stacked containers filled with product packages; and
a fully articulated robotic arm that is located on the work platform between the first forklift for ascent and the second forklift for descent, wherein a free end of the fully articulated robotic arm comprises a gripper device that firmly grasps and lifts at least one empty container so that the at least one empty container is unstacked and transferred from the inlet pallet so as to be stacked on the outlet pallet in order to be subsequently filled with product packages by the articulated arm in the first work zone; and
a third work zone comprising:
a first filling train comprising:
a first continuously moving conveyor belt with an ascending configuration for conveying the product packages coming from distribution chutes in the packaging zone to a first accumulation zone formed by the two parallel discontinuous conveyor belts in the first work zone, by a first series of fins perpendicular to the first continuously moving conveyor belt;
a first discontinuous connecting belt and a second discontinuous connecting belt located at an end of the first continuously moving conveyor belt to move the product packages horizontally between the distribution chutes coming from the packaging zone and a lower end of the first continuously moving conveyor belt in the third work zone, and to convey the product packages horizontally between an upper end of the first continuously moving conveyor belt in the third work zone and a first one of the two parallel discontinuous conveyor belts in the first work zone;
a second filling train parallel to the first filling train, the second filling train comprising:
a second continuously moving conveyor belt with an ascending configuration for conveying the product packages coming from the distribution chutes in the packaging zone to a second accumulation zone formed by the two parallel discontinuous conveyor belts in the first work zone, by a second series of fins perpendicular to the second continuously moving conveyor belt;

a third discontinuous connecting belt and a fourth discontinuous connecting belt located at an end of the second continuously moving conveyor belt to move the product packages horizontally between the distribution chutes coming from the packaging zone and a lower end of the second continuously moving conveyor belt in the third work zone, and to convey the product packages horizontally between an upper end of the second continuously moving conveyor belt in the third work zone and a second one of the two parallel discontinuous conveyor belts in the first work zone.

2. The system for handling containers with product loading according to claim 1, wherein the articulated arm that lifts the product packages uses suction of regenerative air compressors mounted on the main support.

3. The system for handling containers with product loading according to claim 1, wherein the system uses pallets or dollies.

4. The system for handling containers with product loading according to claim 3, wherein pallets or dollies are mounted on the first guide rail and the second guide of the first forklift for ascent and the third guide rail and the fourth guide rail of the second forklift for descent.

5. The system for handling containers with product loading according to claim 1, wherein the fully articulated robotic arm extends and rotates on an axis of the fully articulated robotic arm by about 360°.

6. The system for handling containers with product loading according to claim 1, wherein the gripper device takes hold of the containers in layers.

7. The system for handling containers with product loading according to claim 6, wherein the gripper device takes hold of five containers and holds them firmly during changes of the inlet pallet.

8. The system for handling containers with product loading according to claim 1, wherein the gripper device comprises a rectangular shaped metal frame comprising two parallel longitudinal load rails that support a variety of clamps with a serrated surface on inner faces of the variety of clamps.

9. The system for handling containers with product loading according to claim 8, wherein the inner faces of the variety of clamps are made of a non-slip material.

10. The system for handling containers with product loading according to claim 8, wherein there are five clamps under a first one of the two parallel longitudinal load rails and three clamps under a second one of the two parallel longitudinal load rails.

11. The system for handling containers with product loading according to claim 10, wherein a configuration of the five clamps and the three clamps on the frame makes it possible to hold containers measuring 58.8×78.8×15.5 cm and 39.4×58.8×13.5 cm.

12. The system for handling containers with product loading according to claim 1, wherein the fully articulated robotic arm is programmed with sensors and logic that allow the fully articulated robotic arm to identify if the empty containers are nested or stacked.

13. The system for handling containers with product loading according to claim 1, wherein the first work zone comprises a second (A) has two articulated arm for filling the containers with packages.

14. The system for handling containers with product loading according to claim 1, wherein the suction device of the articulated arm comprises a tree of suction cups distributed in clusters of four on each branch of the tree of suction cups.

15. The system for handling containers with product loading according to claim 1, wherein the articulated arm detects a/an presence/absence of product packages arriving at the first work zone by a first presence sensor and a second presence sensor on sides of each of the two parallel discontinuous conveyor belts.

16. The system for handling containers with product loading according to claim 1, wherein the work platform in the second work zone comprises a series of adjustment devices for accommodating the empty containers before the empty container are filled.

17. The system for handling containers with product loading according to claim 1, wherein the work platform comprises four pneumatic cylinders mounted on horizontally moving carriages that run within crossbars defining the work platform, in order to move the inlet pallet from a stacking position on the first forklift for ascent to a container stacking and filling position on the second forklift for descent during changes of a pallet.

18. The system for handling containers with product loading according to claim 1, wherein the first forklift for ascent moves the inlet pallet up by one step as the fully articulated robotic arm lifts the at least one empty container.

19. The system for handling containers with product loading according to claim 1, wherein the second forklift for descent moves the outlet pallet down by one step as the fully articulated robotic arm stacks the at least one empty container.

20. A method for handling containers with product loading, the method comprising:

receiving product packages via two bagging trains with a cadence of a line by a distribution conveyor;

raising, by perpendicular fins of continuously moving ascending conveyor belts, the product packages to conveyor belts that make up a first work zone where, with the aid of sensors, pieces in a group of the product packages are counted and a signal is sent to a main processor indicating that the group of the product packages is complete, so as to notify articulated arms that they should take the product packages according to a programmed arrangement;

wherein the articulated arms:

lift the product packages, by a suction device, using a vacuum of regenerative compressors so as to place the product packages inside empty containers following instructions from the main processor; and in parallel, bring an inlet pallet loaded with nested empty containers to an ascent forklift zone;

lifting the inlet pallet with nested empty containers to an unstacking position, which is indicated by a sensor installed on a work platform of an articulated robotic arm;

grasping the empty containers using a gripper device on the articulated robotic arm, which takes an arrangement of empty containers and transfers them from the inlet pallet to an outlet pallet for the arrangement of empty containers to be stacked and filled with bread products;

wherein every time the articulated robotic arm takes a layer of empty containers in an unstacking zone, a forklift for ascent moves the inlet pallet upwards, so that a next layer of empty containers is ready for a next intake;

meanwhile, a forklift for descent waits for the layer of empty containers stacked on the outlet pallet to be filled, by the articulated arms, with product packages, before lowering the outlet pallet to a lower position and leaving space for a next layer of empty containers to be positioned; and wherein once the outlet pallet is complete, with the layers of containers full, the forklift for descent prepares to move the outlet pallet to a final path so as to leave the pallet supported on guide rails of a frame of a main outlet framework.

21. The method according to claim 20, wherein, as the outlet pallet with full containers is removed, the inlet pallet on the forklift for ascent goes from being supported by the guide rails of the forklift for ascent to being supported by pneumatic cylinders mounted on moving carriages that run within crossbars of the work platform so as to move the inlet pallet from the unstacking position on the forklift for ascent to a stacking and filling position on the forklift for descent, to start the cycle again.

22. The method according to claim 20, wherein the pallets are inserted and removed semi-automatically, using a mechanical or electric pallet truck, onto the guide rails with rollers that are at floor level.

23. The method according to claim 20, wherein the pallets are placed in an initial position on the guide rails so as to be centered by a pneumatic system.

24. The method according to claim 20, wherein the pallets are moved by a drag chain onto rollers of the guide rails.

* * * * *